E. E. SLICK.
METHOD OF AND APPARATUS FOR MAKING SHAFTS.
APPLICATION FILED OCT. 10, 1918.
1,359,625. Patented Nov. 23, 1920.
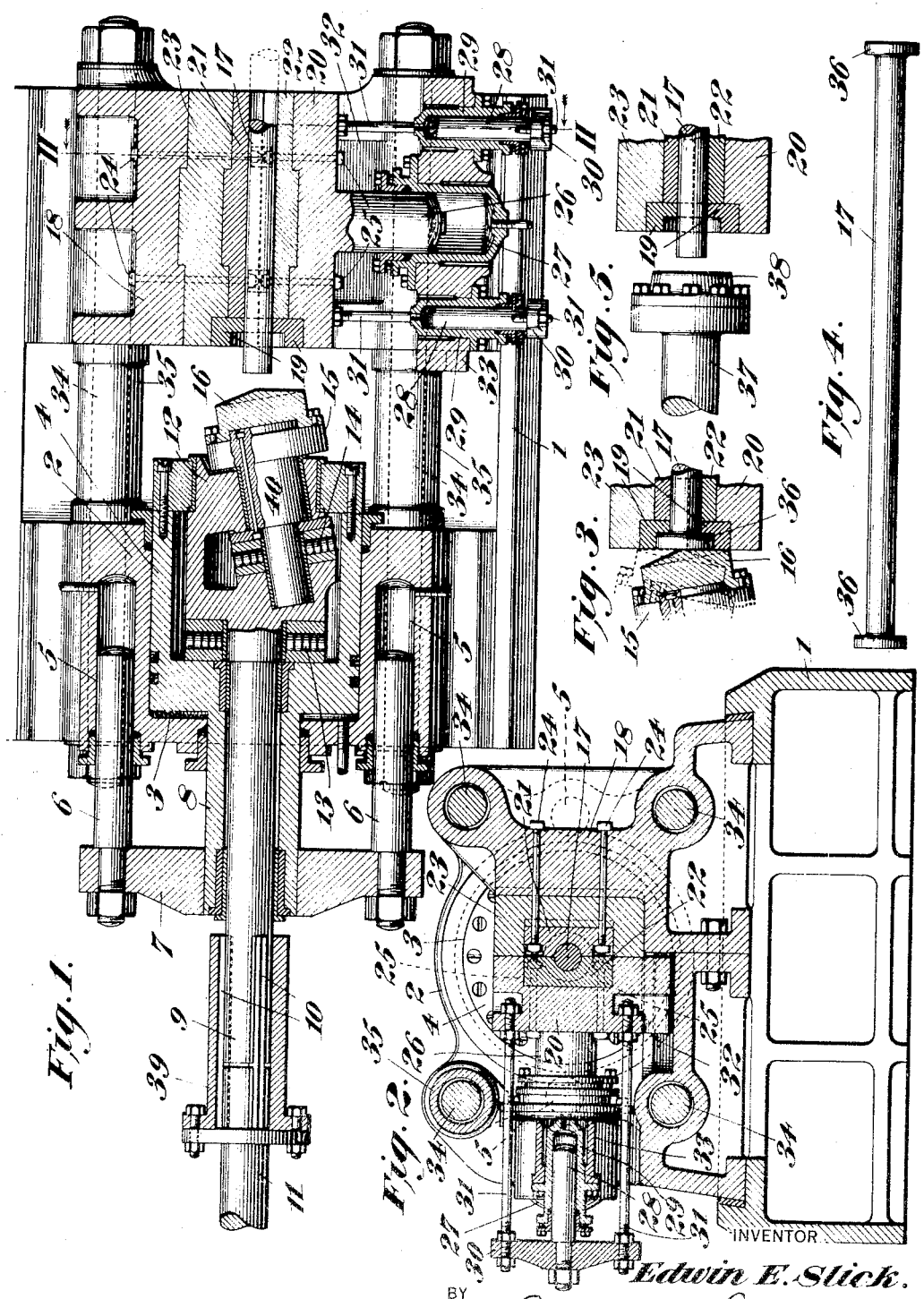

UNITED STATES PATENT OFFICE.

EDWIN E. SLICK, OF WESTMONT BOROUGH, PENNSYLVANIA.

METHOD OF AND APPARATUS FOR MAKING SHAFTS.

1,359,625.  Specification of Letters Patent.  Patented Nov. 23, 1920.

Application filed October 10, 1918. Serial No. 257,566.

*To all whom it may concern:*

Be it known that I, EDWIN E. SLICK, a citizen of the United States, and a resident of the borough of Westmont, county of Cambria, and State of Pennsylvania, whose post-office address is Johnstown, Pennsylvania, have invented certain new and useful Improvements in Methods of and Apparatus for Making Shafts; and I do hereby declare the following to be a full, clear, and exact description of the invention, such as will enable others skilled in the art to which it appertains to make and use the same.

My invention relates to the manufacture of shafts such as are used for all kinds of machinery, including engine shafts, propeller shafts for vessels and, in fact, any kind of shafts or similar objects made of metal consisting of a longitudinal member which may be of round or other cross section and with enlarged end portions or flanges for connecting various sections of the shaft together, or to connect the same to other portions of the mechanism in which these are used.

Although my invention is specially adapted to the manufacture of propeller shafts for ships which are generally very large and long and, consequently, have to be made in sections united together by couplings or flanges, it is also equally adapted to the manufacture of other shafts or similar members of any size or shape whatsoever, as will be readily understood.

In general, my invention consists in first forming a bar of uniform cross section in a rolling mill or otherwise and then utilizing its residual heat or heating it until it is plastic, then placing one of its end portions in a suitable die provided with a cylindrical or other shaped recess in the end thereof and then projecting a forging head forcibly against the end of the hot bar and rotating the forging head on an axis inclined to the axis of the bar, whereby the end of the bar is upset and, at the same time, rolled to fill the recess in the end of the die, thereby forming an enlarged portion or flange on the end thereof. If a flange is desired on the other end of the bar, the bar is withdrawn from the die; the other end, heated to plasticity, is introduced into the die with its end projecting therefrom and the operation is repeated, thereby producing a shaft with a flange on each end adapted to connect it to another shaft or to any other portion of the mechanism in which it is to be used.

The die, in which the body of the bar is held preparatory to forming a flange on the end thereof, is preferably a sectional die which may be opened to receive or closed to firmly clamp the bar, preparatory to forming the flanged end thereon, although in cases where only one flange is to be formed on one end of the bar, this may be done in a closed die and the bar introduced therein and withdrawn therefrom longitudinally.

By means of my invention I may manufacture shafts of any size from a fraction of an inch in diameter and a few inches long to large shafts of 24 inches or more in diameter, and 25 or 30 feet long, or more.

Heretofore, it has been necessary, in making flanged shafts of large sizes, to take a metal bloom or ingot of very large diameter and shorter than the finished shaft, and hammer or press-forge the same between swaging dies in order to draw it out and form its cross section, while leaving the ends forming the flanges of larger size. This is a very slow, tedious and expensive operation, besides which the shafts made in this manner are rough and not close to their finished dimensions. In addition to this the junction between the body of the shafts so forged and the flanged ends thereof, has the grain or fiber of the material disposed in an incorrect way to withstand the stresses of use and such shafts are generally weak at their ends. On the other hand, by means of my invention, the bar is rolled in a rolling mill or otherwise formed to substantially the finished diameter of the body portion and the flanged ends are upset and rolled thereon from the body of the bar and the fiber or grain of same is disposed in a regularly curved manner from the body of the shaft into the flanges in such a way as to make a very strong junction between the body of the shaft and the flanges so that the shaft and its flanges are much stronger, besides being smooth and very slightly larger than the finished dimensions which are preferably formed by machining in a lathe or similar tool. In addition to this my method is economical, as bars can be economically and exactly rolled in a rolling mill and the flanges can be cheaply and quickly upset thereon by means of my invention.

Having thus given a general description of my invention, I will now, in order to make the matter more clear, refer to the annexed sheet of drawings which forms part of this specification and in which like characters of reference refer to like parts:—

Referring now to the apparatus: Figure 1 is a longitudinal sectional plan of the machine; Fig. 2 is a transverse sectional elevation taken on the line II—II of Fig. 1 through the gripping device and looking in the direction of the arrows. Fig. 3 is a detailed sectional elevation illustrating the positions of the forging head when the same is projected forward to the limit of its movement at the completion of the upsetting and rolling operation, one extreme position of the forging head being indicated in full lines and the opposite position, if it is turned about 180 degrees, is shown in dotted lines. Fig. 4 is a view of the finished shaft with upset flanged ends; and Fig. 5 illustrates another form of forging and upsetting head but without the rolling action of the constructions illustrated in Figs. 1, 2 and 3.

Referring now to the characters of reference on the drawings:—1 is the base frame of the apparatus shown as a ribbed casting adapted to be set upon any suitable foundation, 2 is the forging pressure cylinder casing provided with a central cylinder opening 3 therein forming a pressure cylinder, 4 is a pressure plunger mounted within the pressure cylinder provided with suitable glands, stuffing boxes and plunger rings, as illustrated. 5 are the pull-back cylinders formed in the cylinder casing in which are mounted the pull-back plungers 6, the outer ends of which are secured to the cross-head 7. 8 is an outwardly extending projection formed integral with or secured to the pressure plunger 4 and of hollow cylindrical form, the outer end being secured to the pull-back cross-head 7, and the driving shaft 9 is mounted therein, secured to or formed integral with the carrier 12, which is adapted to be rotated by the shaft 9 and projected forward by the pressure plunger 4. The driving shaft 9 is provided with a coupling sleeve 39, as illustrated, and with splines or keys 10, adapted to rotatably connect the shaft 9 with the driving shaft 11, while at the same time permitting the forward or backward longitudinal movement of the shaft 9 and attachments as necessary during the operation. The carrier 12 is provided with a rear roller thrust bearing 13 and mounted in the carrier is the rotatable shouldered shaft 40, the axis of said shaft being inclined to the main axis of the driving shaft 9, the axis of the bar 17 and the main axis of the machine. The outer end of this shaft 40 is provided with a disk or flange 15 on which is mounted the forging die or head 16, which, as illustrated, is provided with a conical outer surface of small angularity. The shaft 40 is also provided with roller thrust bearings 14, adapted to withstand the pressure transmitted thereto during the working operation. The bar or shaft to be operated upon is indicated generally as 17, and when this is hot with its residual heat or after it has been heated, it is clamped between the stationary jaw 18 and the movable jaw 20, the end portion of these clamping jaws being provided with a two-piece flange die 19, the interior surface of which is formed to produce a flange of the desired size on the shaft 17. The clamping jaws are provided with an inner die 21, removably secured to the stationary head and another inner die 22, removably attached to the movable head. 23 is a die holder adapted to receive and hold the clamping die 21, 24 are bolts for securing the die 21 in place, and 25 are bolts for securing the die 22 in position. The clamping dies are operated by the pressure plunger 26, which operates in the clamping pressure cylinder 27, and this portion of the apparatus is provided with pull-back plungers 28 which are mounted in pull-back cylinders 29, provided with cross-heads 30 and pull-back rods 31, secured to the movable clamping jaw. 32 is a slide on which the movable clamping jaw is adapted to be moved backward or forward, and 33 is the clamping cylinder block or casing in general. The two major portions of the apparatus, namely, the dies and the rotating forging and upsetting member, and their appurtenances, are secured together by very large through tie-bolts 34 to amply withstand the severe stresses of operation, and are held at proper distance apart by the thimbles or separators 35. The flange formed on the shaft 17 is 36.

37 is a modified type of forging head which is not adapted to be rotated but merely moves backward or forward under suitable pressures, preferably by means of hydraulic cylinders not shown, the forging head thereof being illustrated as 38.

The pressure cylinder 3 and the clamping cylinder 27 are supplied with fluid under high pressure with suitable control means in order that they may do their work, and the pull-back cylinders coöperating with the pressure plunger and the clamping plunger are also supplied with fluid under somewhat less pressure and preferably constant pressure from the general works system, so that when the operating valves of the pressure cylinders are open to the exhaust, the constant pressure in the pull-back cylinders will retract the forging head or the clamping die so that the apparatus is ready for another operation.

The operation of the apparatus illustrated in Figs. 1, 2 and 3, is as follows: The movable clamping die is withdrawn by opening the clamping cylinder to exhaust, whereupon the pressure in the pull-back cylinders withdraws the clamping die and a heated bar of round or other cross section is introduced between the dies with its end projecting out beyond the same. The exhaust to the clamping cylinder is closed and fluid under high pressure supplied thereto, whereupon the bar is firmly clamped between the clamping dies; the shaft 9 is then rotated on its axis by any suitable source of power, and fluid under high pressure is admitted to the pressure cylinder 3 which moves the forging plunger and attached parts forward, so that the forging head 16 contacts with and upsets the end of the heated bar, and the forging head is rotated at an angle, thereby further upsetting the bar and causing the metal to flow uniformly to fill the annular opening of the flange die. It will be noticed that the angle of the shaft carrying the forging die and the angle of slope of the conical head of the die are about the same and that the contacting operating surface of the forging die is substantially at right angles to the axis of the shaft to be operated upon and forms the outer end of the flange to a flat surface approximately at right angles to the body of the shaft, all as illustrated. After the flange is thus formed on one end of the bar, the clamping dies are opened, the forging head retracted, the other end of the shaft, if desired, is placed in the clamping dies and a flange similarly formed on the other end.

As illustrated in Fig. 5, the clamping dies receive and hold the bar, the end slightly projecting therefrom, whereupon the forging head 38 is pressed forward forcibly and upsets the end of the bar to fill the annular space in the die adjacent to the end of same, this being purely an upsetting operation without the rolling action of the apparatus, illustrated in Figs. 1, 2 and 3. I may also provide a stop which abuts the farther end of the bar to prevent its longitudinal movement when the flange is forming, and I may also provide an adjustable limit or stop for the forward movement of the upsetting and rolling plunger and attachments.

Although I have described and illustrated my invention in considerable detail, I do not wish to be limited to the exact and specific details thereof as shown and described, but may use such modifications in, substitutions for, or equivalents thereof, as are embraced within the scope of my invention, or as pointed out in the claims.

Having thus described my invention, what I claim and desire to secure by Letters Patent is:—

1. The method of making a shaft which consists in clamping a heated bar between dies, the end portion of said bar projecting therethrough, the ends of the dies adjacent to said bar being formed with a substantially flat cylindrical recess, and upsetting said end by pressure and rolling action into said recess.

2. The method of forming a shaft which consists in laterally clamping a bar between a pair of dies provided with recessed ends of flat cylindrical form, and then rocking another die upon the projecting end of the bar in a circular path while projecting the rocking die against the end of the bar.

3. The method of forming a shaft comprising laterally clamping a bar between a pair of dies, with its end projecting therefrom, said dies being provided with a flange-shaped recess adjacent to the end of the bar, and then projecting a forging head against the end of the bar while at the same time rocking said forging head around a circular path, thereby forming a flange with a substantially flat end.

4. The method of forming a shaft comprising laterally clamping a bar between a pair of dies substantially conforming to the outer surface thereof, the end of the bar projecting therefrom, the dies adjacent to the said projecting end having a flange-shaped recess formed therein, projecting a forging head of conical working surface against the projecting end of the bar, while at the same time rocking said forging head around a circular path, thereby forming a flange with a substantially flat end.

5. An apparatus for forging shafts comprising a pair of dies adapted to laterally clamp a bar therebetween, said dies being provided with a flange-shaped recess adjacent to the end of the bar, means for projecting and retracting said clamping dies, an upsetting and forging die rotatably mounted on an axis inclined to the axis of the bar, and means for forwardly projecting and rotating said forging die.

6. An apparatus for forging shafts comprising a pair of dies adapted to laterally clamp a bar therebetween with its end projecting therefrom, means for projecting and retracting said clamping dies, said dies being provided with a flange-shaped recess adjacent to the end of the bar, an upsetting and forging die arranged to rock in a circular path against the projecting end of said bar and upset same into the recess aforesaid.

7. In an apparatus for making shafts a pair of dies adapted to laterally clamp a bar therebetween, the ends of said dies being provided with a flange-shaped recess, a rotating and forging head mounted on a rotatable carrier and having a forming surface on one end rotatably mounted in and at an angle to the axis of the carrier, and means for rotating and projecting the same.

8. An apparatus for forging shafts comprising dies adapted to laterally clamp a bar therebetween, a carrier provided with means for rotating and projecting the same, a rotatable shaft angularly mounted in said carrier and having a forging and upsetting member thereon.

In witness whereof I hereunto affix my signature.

EDWIN E. SLICK.